(12) United States Patent
Nakajima (10) Patent No.: US 6,536,965 B2
(45) Date of Patent: Mar. 25, 2003

(54) CALENDAR PRODUCING SYSTEM, PRODUCING METHOD, SELLING SYSTEM AND SELLING METHOD

(75) Inventor: Kazuki Nakajima, Tokyo (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 121 days.

(21) Appl. No.: 09/769,381

(22) Filed: Jan. 26, 2001

(65) Prior Publication Data

US 2001/0010772 A1 Aug. 2, 2001

(30) Foreign Application Priority Data

Jan. 28, 2000 (JP) .......................... 2000-020416

(51) Int. Cl.[7] .............................. H04N 1/04; G03F 3/10
(52) U.S. Cl. .......................................... 400/62; 348/527
(58) Field of Search ............................. 400/61, 62, 65, 400/67; 364/200; 395/650; 40/119; 358/487, 527; 705/27

(56) References Cited

U.S. PATENT DOCUMENTS

| | | | | |
|---|---|---|---|---|
| 4,991,089 A | * | 2/1991 | Shorter | 364/200 |
| 5,247,670 A | * | 9/1993 | Matsunaga | 395/650 |
| 5,457,904 A | * | 10/1995 | Colvin | 40/119 |
| 5,666,215 A | * | 7/1997 | Fredlund et al. | 358/487 |
| 6,324,521 B1 | * | 11/2001 | Shiota et al. | 705/27 |

* cited by examiner

Primary Examiner—Anh T. N. Vo
(74) Attorney, Agent, or Firm—McGinn & Gibb, PLLC

(57) ABSTRACT

A calendar selling system comprises a server that stores information of a plurality of pictures and a terminal that receives information of the plurality of pictures from the server and shows the information to a user, and the user selects pictures for a calendar from the plurality of pictures according to the information with the terminal to order the calendar. The calendar selling system also comprises a printing office that receives information of the pictures selected by the user from the server, prints the calendar with the pictures selected by the user and dates set by the user or automatically set according to the date of the order, delivers the calendar to the user and bills the user. Therefore, the desired calendar can be purchased all through the year and delivered to the user quickly.

22 Claims, 12 Drawing Sheets

| | |
|---|---|
| 54 | Gallery & Store |
| 44 | Store Menu |
| 56 | Original Print |
| 58 | CD-ROM |
| 59 | Others |
| 46 | Info |
| 94 | Order |
| 64 | Return |

Cashier

Confirm your order. WEBWEB will charge you the total below.

| User | Mineko Fuji |
|---|---|
| User ID | yyf0000 |
| E-mail | fujiko@film.co.jp |
| Provider | WEBWEB |
| Provider User ID | mineko |

| Item | Code | Price | Qty. | Amount |
|---|---|---|---|---|
| FUJI Original Calendar | 001 | ¥0,000 | 1 | ¥0,000 |
| FUJI Original Calendar | 002 | ¥0,000 | 1 | ¥0,000 |
| FUJI Original Calendar | 003 | ¥0,000 | 1 | ¥0,000 |
| FUJI Original Calendar | 004 | ¥0,000 | 1 | ¥0,000 |
| FUJI Original Calendar | 005 | ¥0,000 | 1 | ¥0,000 |
| | | | Subtotal | ¥0,000 |
| | | | Tax | ¥0,000 |
| | | | Delivery Chg. | ¥0,000 |
| | | | Total | ¥0,000 |

| Delivery Address | Mineko Fuji 0-0-0 Azabu Minato-ku Tokyo 106-8602 Japan |
|---|---|
| Phone Number | 03-3406-0000 |
| Average Delivery Time | 7 days |

If you have questions, call FDI support center at 0465-99-0000.

F I G.12

| User | Mineko Fuji |
|---|---|
| User ID | yyf0000 |
| E-mail | fujiko@film.co.jp |
| Provider | WEBWEB |
| Provider User ID | mineko |

| Item | Code | Price | Qty. | Amount |
|---|---|---|---|---|
| FUJI Original Calendar | 001 | ¥0,000 | 1 | ¥0,000 |
| FUJI Original Calendar | 002 | ¥0,000 | 1 | ¥0,000 |
| FUJI Original Calendar | 003 | ¥0,000 | 1 | ¥0,000 |
| FUJI Original Calendar | 004 | ¥0,000 | 1 | ¥0,000 |
| FUJI Original Calendar | 005 | ¥0,000 | 1 | ¥0,000 |
| | | | Subtotal | ¥0,000 |
| | | | Tax | ¥0,000 |
| | | | Delivery Chg. | ¥0,000 |
| | | | Total | ¥0,000 |

| Delivery Address | Mineko Fuji0-0-0 Azabu Minato-ku Tokyo 106-8602 Japan |
|---|---|
| Phone Number | 03-3406-0000 |
| Average Delivery Time | 7 days |

If you have questions, call FDI support center at 0465-99-0000.

Thank You Very Much!

Gallery & Store — 54
Front — 48

CALENDAR PRODUCING SYSTEM, PRODUCING METHOD, SELLING SYSTEM AND SELLING METHOD

BACKGROUND OF THE INVENTION

1. Field of the Invention

The present invention relates generally to a calendar producing system, a producing method, a selling system and a selling method. More particularly, the present invention relates to a calendar producing system, a producing method, a selling system and a selling method in which a user orders a calendar and a printing office prints the calendar and delivers it to the user.

2. Description of Related Art

Calendars generally show dates of January through December, and users usually purchase them at the end of the previous year.

However, the calendars need to be produced according to the demand for the end of the year, and some users can not get the desired calendars since the demand exceeds the supply at the end of the year.

SUMMARY OF THE INVENTION

In view of the foregoing, it is an object of the present invention to provide a calendar producing system, a producing method, a selling system and a selling method in which a calendar can be produced and purchased all through the year and can be delivered to a user quickly.

To achieve the above-mentioned object, the present invention is directed to a calendar producing system comprising: a server that stores information of a plurality of pictures; a terminal that receives information of the plurality of pictures from the server and shows the information to a user, the user selecting pictures for a calendar from the plurality of pictures according to the information with the terminal to order the calendar; and a printing office that receives information of the pictures selected by the user from the server and prints the calendar with the pictures selected by the user and dates set by the user or automatically set according to the date of the order.

According to the present invention, the calendar producing system comprises the server that stores the information of a plurality of pictures and the terminal that receives the information of the plurality of pictures from the server and shows the information to the user, and the user selects pictures for the calendar from the plurality of pictures according to the information with the terminal to order the calendar. The calendar producing system also comprises the printing office that receives the information of the pictures selected by the user from the server and prints the calendar with the pictures selected by the user and the dates set by the user or automatically set according to the date of the order. Therefore, the calendar can be produced quickly all through the year.

To achieve the above-mentioned object, the present invention is directed to a calendar producing system comprising: a machine that stores information of a plurality of pictures and shows the information of the plurality of pictures to a user, the user selecting pictures for a calendar from the plurality of pictures according to the information with the machine to order the calendar; and a printing office that receives information of the pictures selected by the user from the machine and prints the calendar with the pictures selected by the user and dates set by the user or automatically set according to the date of the order.

According to the present invention, the calendar producing system comprises the machine that stores the information of a plurality of pictures and shows the information of the plurality of pictures to the user, and the user selects pictures for the calendar from the plurality of pictures according to the information with the machine to order the calendar. The calendar producing system also comprises the printing office that receives the information of the pictures selected by the user from the machine and prints the calendar with the pictures selected by the user and the dates set by the user or automatically set according to the date of the order. Therefore, the calendar can be produced quickly all through the year.

To achieve the above-mentioned object, the present invention is directed to a calendar producing method wherein: a user selects pictures for a calendar from a plurality of pictures with a terminal to order the calendar; information of the pictures selected by the user is transmitted to a printing office through a communication circuit; and the printing office prints the calendar with the pictures selected by the user and dates set by the user or automatically set according to the date of the order.

According to the present invention, in the calendar producing method, the user selects pictures for the calendar from a plurality of pictures with the terminal to order the calendar, and the information of the pictures selected by the user is transmitted to the printing office through the communication circuit, and the printing office prints the calendar with the pictures selected by the user and the dates set by the user or automatically set according to the date of the order. Therefore, the calendar can be produced quickly all through the year.

To achieve the above-mentioned object, the present invention is directed to a calendar selling system comprising: a server that stores information of a plurality of pictures; a terminal that receives information of the plurality of pictures from the server and shows the information to a user, the user selecting pictures for a calendar from the plurality of pictures according to the information with the terminal to order the calendar; and a printing office that receives information of the pictures selected by the user from the server, prints the calendar with the pictures selected by the user and dates set by the user or automatically set according to the date of the order, delivers the calendar to the user and bills the user.

According to the present invention, the calendar selling system comprises the server that stores the information of a plurality of pictures and the terminal that receives information of the plurality of pictures from the server and shows the information to the user, and the user selects pictures for the calendar from the plurality of pictures according to the information with the terminal to order the calendar. The calendar selling system also comprises the printing office that receives the information of the pictures selected by the user from the server, prints the calendar with the pictures selected by the user and the dates set by the user or automatically set according to the date of the order, delivers the calendar to the user and bills the user. Therefore, the desired calendar can be purchased all through the year and delivered to the user quickly.

To achieve the above-mentioned object, the present invention is directed to a calendar selling system comprising: a machine that stores information of a plurality of pictures and shows the information of the plurality of pictures to a user, the user selecting pictures for a calendar from the plurality of pictures according to the information with the machine to order the calendar; and a printing office that receives information of the pictures selected by the user from the machine, prints the calendar with the pictures selected by the user and dates set by the user or automatically set according to the date of the order, delivers the calendar to the user and bills the user.

According to the present invention, the calendar selling system comprises the machine that stores the information of a plurality of pictures and shows the information of the plurality of pictures to the user, and the user selects pictures for the calendar from the plurality of pictures according to the information with the machine to order the calendar. The calendar selling system also comprises the printing office that receives the information of the pictures selected by the user from the machine, prints the calendar with the pictures selected by the user and the dates set by the user or automatically set according to the date of the order, delivers the calendar to the user and bills the user. Therefore, the desired calendar can be purchased all through the year and delivered to the user quickly.

To achieve the above-mentioned object, the present invention is directed to a calendar selling method wherein: a user selects pictures for a calendar from a plurality of pictures with a terminal to order the calendar; information of the pictures selected by the user is transmitted to a printing office through a communication circuit; the printing office prints the calendar with the pictures selected by the user and dates set by the user or automatically set according to the date of the order; and the printing office delivers the calendar to the user and bills the user.

According to the present invention, in the calendar selling method, the user selects pictures for the calendar from a plurality of pictures with the terminal to order the calendar, and the information of the pictures selected by the user is transmitted to the printing office through the communication circuit, and the printing office prints the calendar with the pictures selected by the user and the dates set by the user or automatically set according to the date of the order, and the printing office delivers the calendar to the user and bills the user. Therefore, the desired calendar can be purchased all through the year and delivered to the user quickly.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
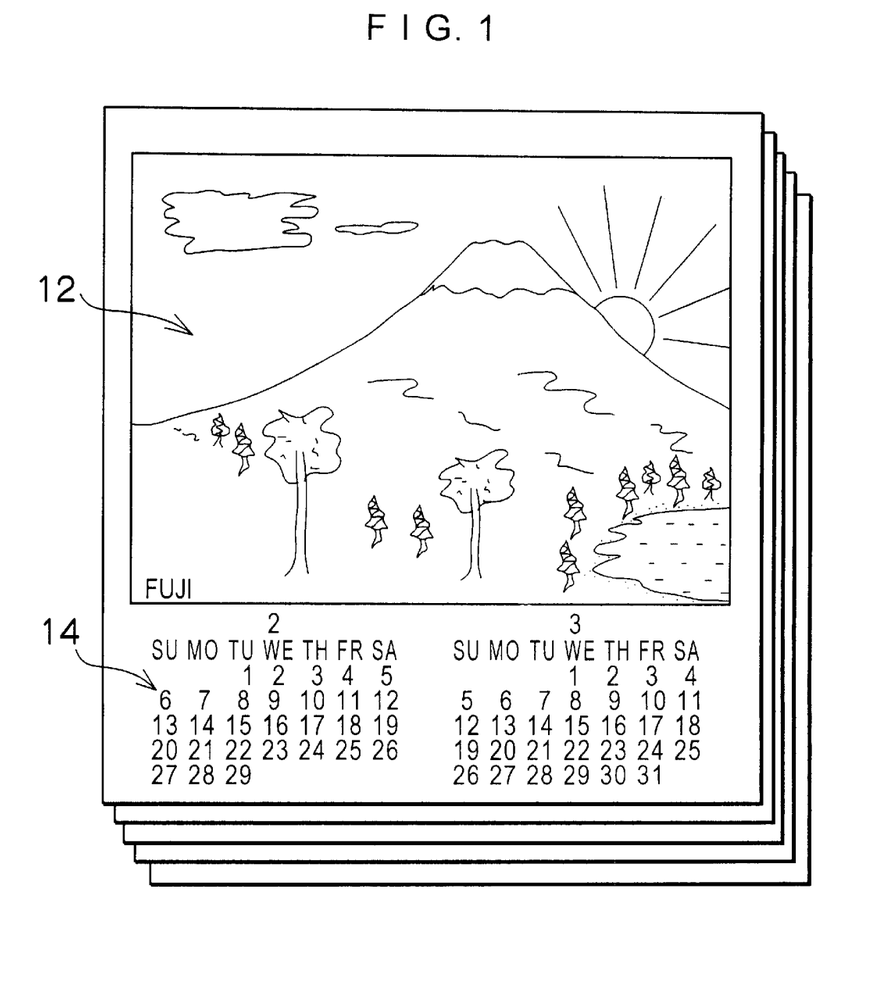
FIG. 1 is a diagram showing a printed calendar.

FIG. 1 is a diagram showing a printed calendar 10.

As shown in FIG. 1, a leaf of the wall-hanging calendar 10 has a picture 12 and dates 14.

The picture 12 was selected from various pictures by a user, and the start month (February in FIG. 1) of the dates 14 was automatically set according to the order day or designated by the user.

A calendar producing system, a producing method, a selling system and a selling method in which the user orders the calendar 10 and the calendar 10 is printed and delivered to the user will now be explained.

Figure 2:
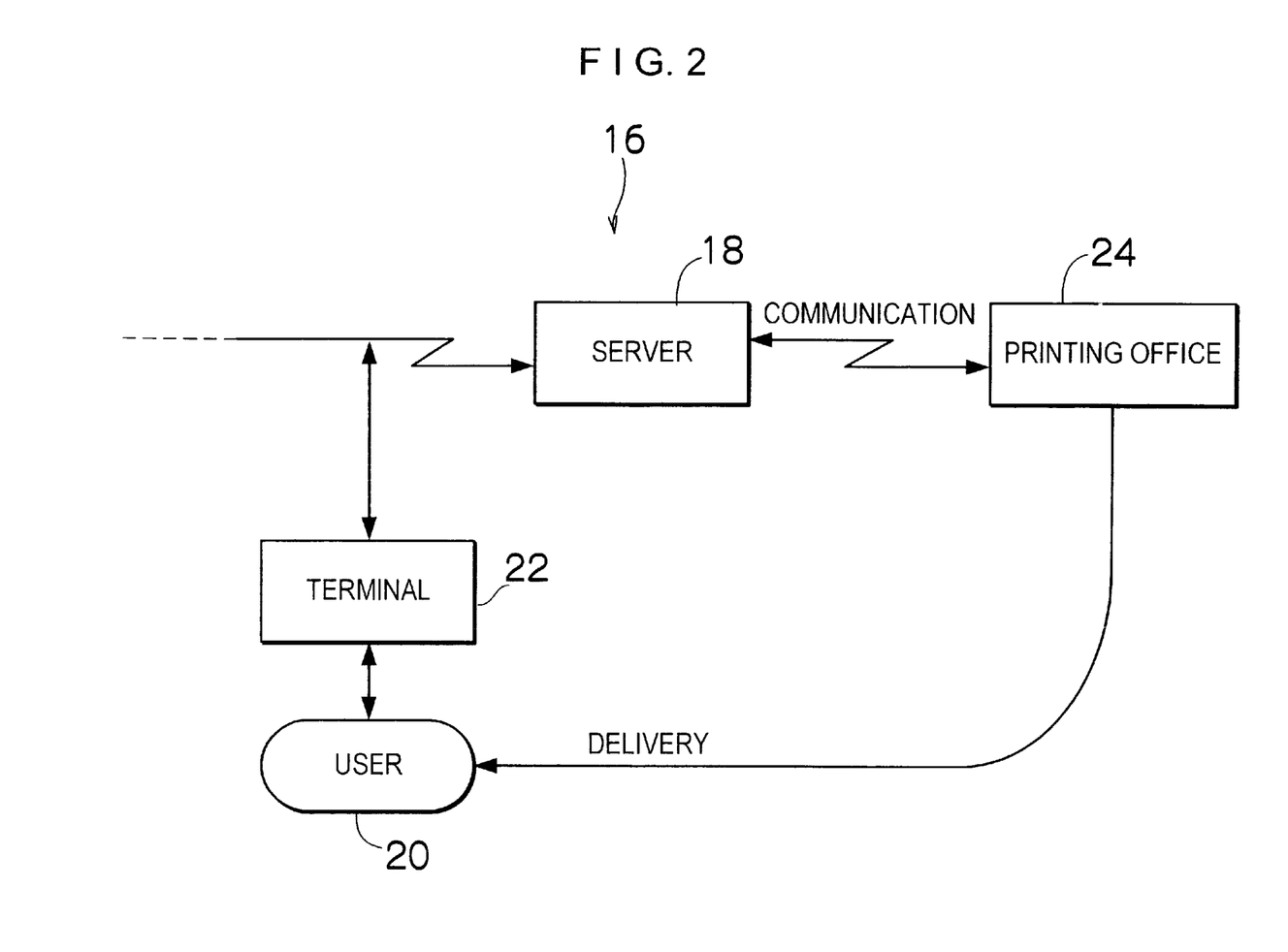
FIG. 2 is a block diagram showing a calendar producing and selling system.

FIG. 2 is a block diagram showing a calendar producing and selling system.

As shown in FIG. 2, the calendar producing and selling system comprises a server 18 with a communicating device, a terminal 22 that can communicate with the server 18 and is operated by the user 20, and a printing office 24 that can communicate with the server 18 and print according to information received from the server 18.

The server 18 has a storage device such as a hard disc and a memory storing information of various pictures and dates. The terminal 22 has an informing device such as a display for informing the user 20 of the information and a designating device such as a keyboard with which the user 20 designates desired pictures and start month. The terminal may be a personal computer on the market with an input device, a display device and a communication device.

The printing office 24 has a printing device that prints the calendar 10 with the designated pictures and dates and a sending device that sends the printed calendar 10 to the user 20.

The user 20 operates the terminal 22 to designate the desired pictures and the start month with reference to the information stored in the server 18. Then, the user 20 sets a delivery address, confirms the charge and the payment method, and orders the calendar 10.

After the user orders the calendar 10, the order information set by the user 20 is transmitted from the server 18 to the printing office 24. The printing office 24 prints the calendar 10 according to the order information received from the server 18, and sends the calendar 10 to the delivery address. The printing office 24 bills the user 20 for the calendar 10 and the delivery and receives payment.

The printing office 24 may previously print calendars in estimation of orders and stock them until they are ordered.

Figure 3:
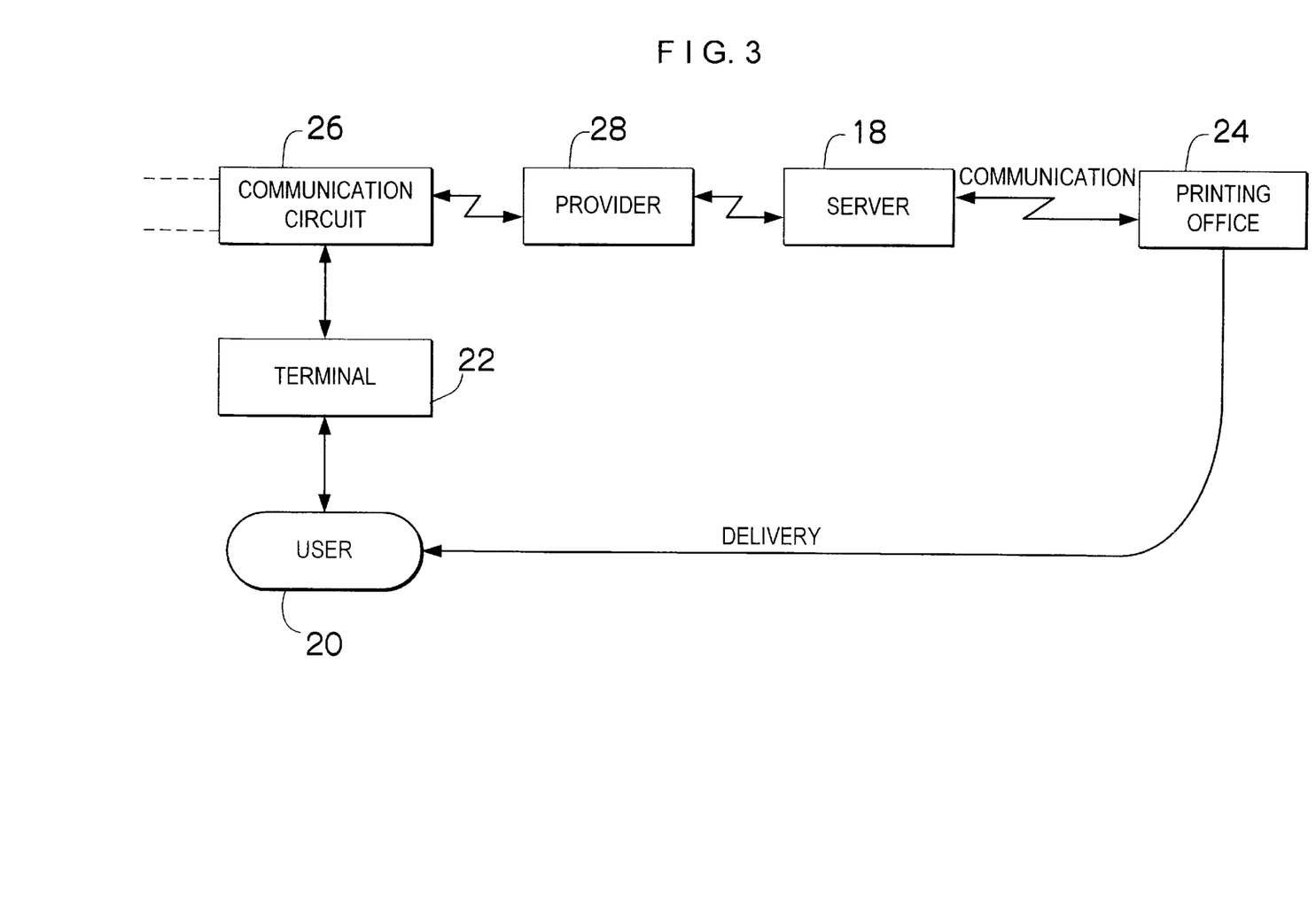
FIG. 3 is a block diagram showing another calendar producing and selling system.

FIG. 3 is a block diagram showing another calendar producing and selling system.

As shown in FIG. 3, the calendar producing and selling system comprises a provider 28 of a network (for example, the Internet) for which the user 20 has signed up through a communication circuit 26, the terminal 22 that can communicate with the provider 28 and is operated by the user 20, the server 18 that can communicate with the provider 28, and the printing office 24 that prints according to information received from the server 18.

The server 18 may be integrated into the provider 28 or the printing office 24 instead of being provided separately.

The user 20 operates the terminal 22 to designate the desired pictures and the start month with reference to the information stored in the server 18. Then, the user 20 sets the delivery address, confirms the charge and the payment method, and orders the calendar 10.

After the user orders the calendar 10, the order information set by the user 20 is transmitted to the printing office 24 through the provider 28 and the server 18. The printing office 24 prints the calendar 10 according to the order information received from the server 18, and sends the calendar 10 to the delivery address.

The printing office 24 bills the provider 28 for the calendar 10 and the delivery, and the provider 28 bills the user 20 for the calendar 20 as well as the connection. The printing office 24 may directly bill the user 20, and it may bill the user 20 through a credit company.

In the system, the user 20 orders the calendar 10 through the server 18 and the provider 28. However, the terminal 22 may be a machine including the server 18, and it may be a machine including the communication circuit 26 and the provider 28.

Figure 4:
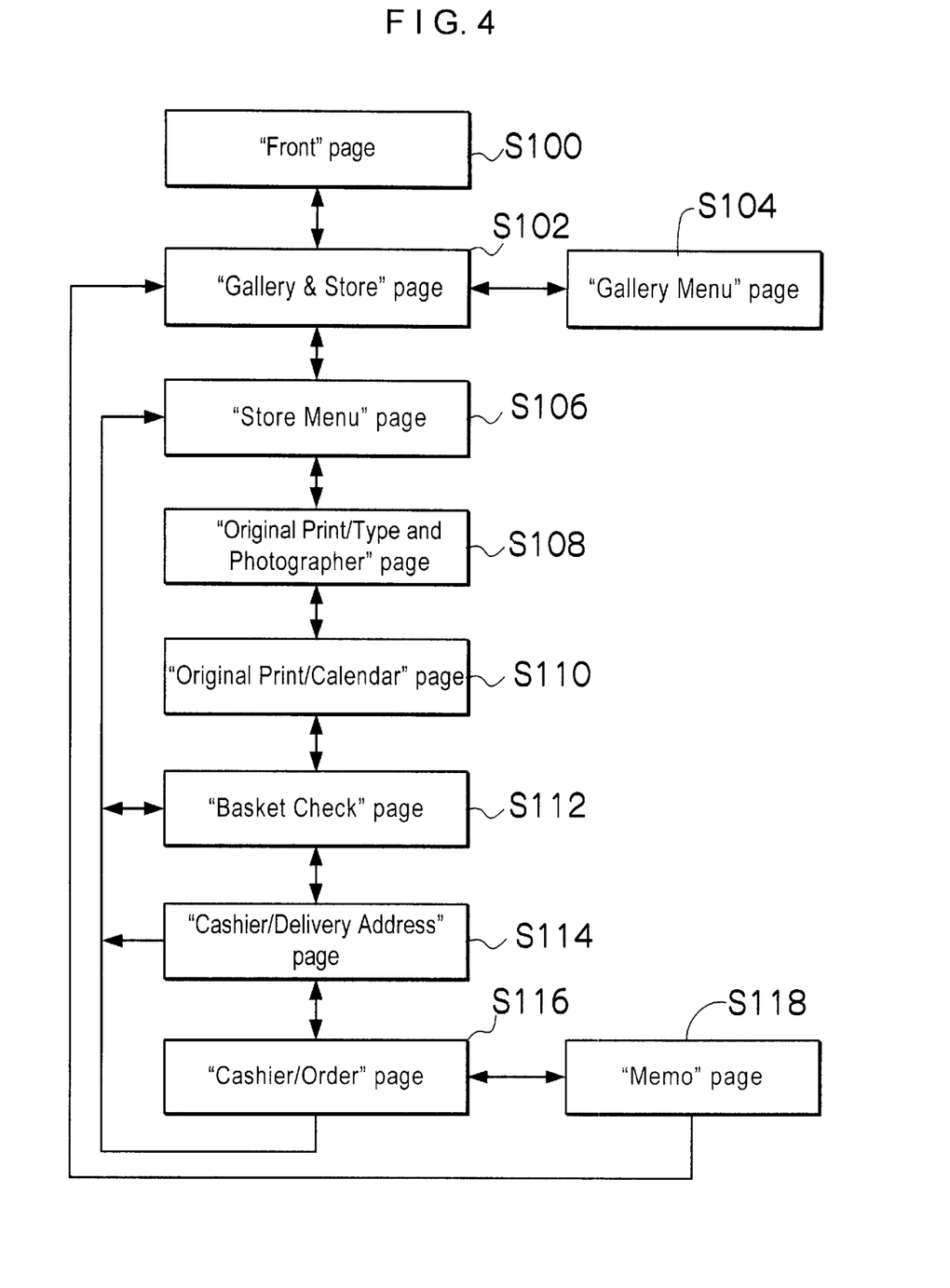
FIG. 4 is a flowchart showing a transition of Webpages displayed by a terminal for a user.

FIG. 4 is a flowchart showing a transition of Webpages displayed by the terminal 22 for the user 20.

As shown in FIG. 4, the Webpages are the "Front" page displayed at step 100 that is the homepage of the Website, the "Gallery & Store" page displayed at step 102 for choosing to go to a gallery or a store, the "Gallery Menu" page displayed at step 104 for looking at framed pictures in the gallery, the "Store Menu" page displayed at step 106 for choosing to shop for an original print, a CD-ROM or others, the "Original Print/Type and Photographer" page displayed at step 108 for choosing the type of the original print (a calendar, a postcard or a framed picture) and selecting a photographer, the "Original Print/Calendar" page displayed at step 110 for selecting pictures of the selected photographer for the calendar and setting the start month of the calendar and putting the calendar in a basket, the "Basket Check" page displayed at step 112 for confirming items in the basket, the "Cashier/Delivery Address" page displayed at step 114 for setting the delivery address, the "Cashier/Order" page displayed at step 116 for confirming the order and the delivery address, and the "Memo" page displayed at step 118 for informing the user 20 that the order has been completed.

Each of the Webpages will now be explained.

Figure 5:
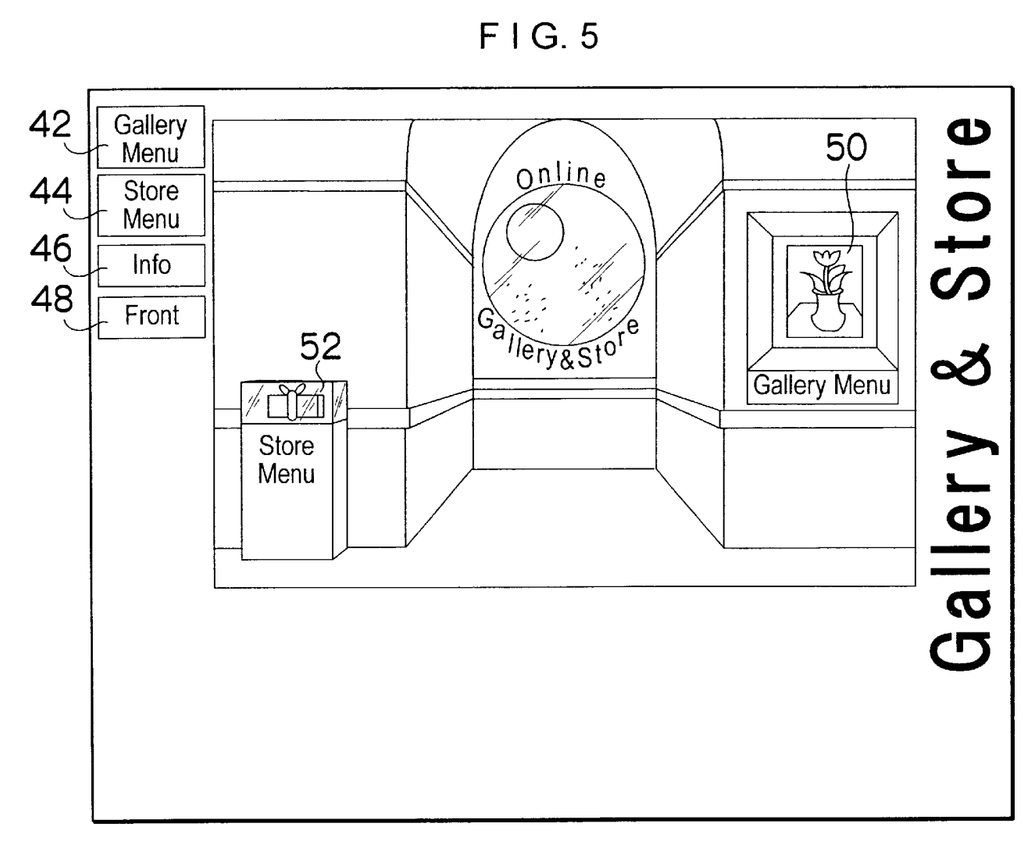
FIG. 5 is a diagram showing the "Gallery & Store" page.

If the user clicks the "Gallery & Store" button on the "Front" page displayed at step 100, the "Gallery & Store" page shown in FIG. 5 is displayed at step 102. On the "Gallery & Store" page in FIG. 5, the "Gallery Menu" button 42 for displaying the "Gallery Menu" page, the "Store Menu" button 44 for displaying the "Store Menu" page, the "Info" button 46 for the "Info" page explaining how to operate on the displayed page, and the "Front Page" button 48 for displaying the "Front" page are displayed.

In addition, the "Gallery Menu" icon 50 for displaying the "Gallery Menu" page and the "Store Menu" icon 52 for displaying the "Store Menu" page are displayed on the "Gallery & Store" page.

The "Gallery & Store" page may be switched between a daytime version and a nighttime version according to the time.

Figure 6:
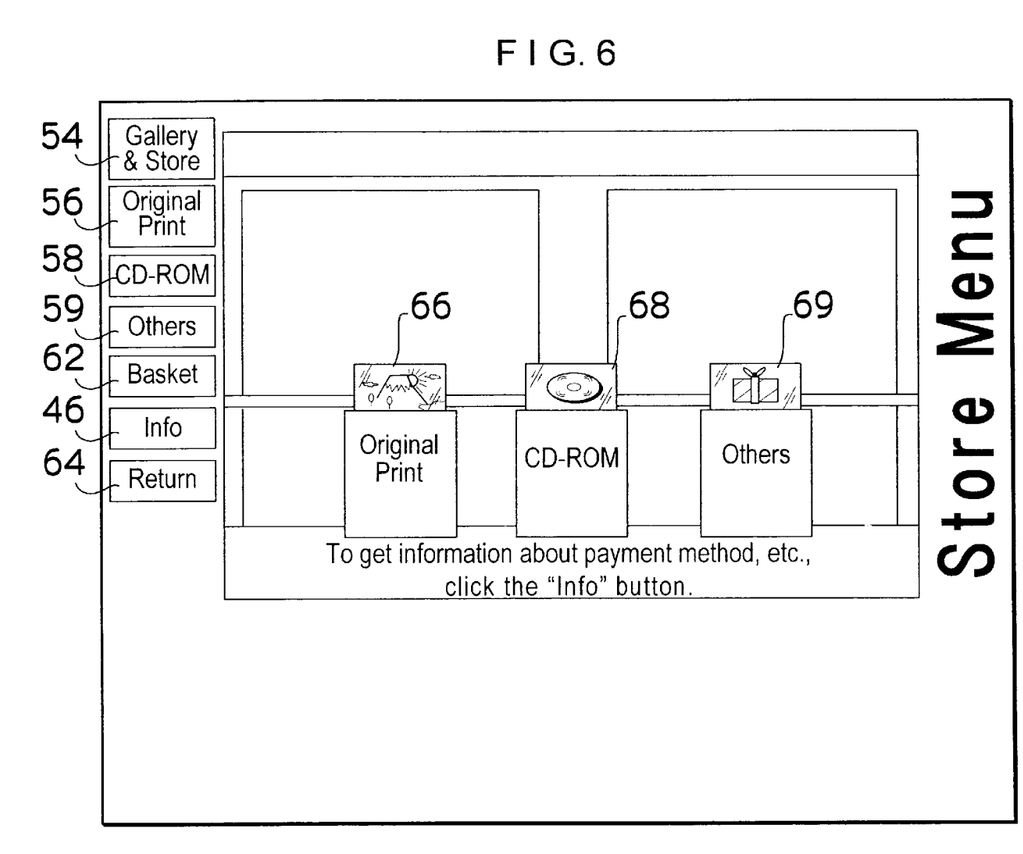
FIG. 6 is a diagram showing the "Store Menu" page.

If the user clicks the "Store Menu" button 44 or the "Store Menu" icon 52, the "Store Menu" page shown in FIG. 6 is displayed at step 106.

On the "Store Menu" page in FIG. 6, the "Gallery & Store" button 54 for displaying the "Gallery & Store" page in FIG. 5, the "Original Print" button 56 for displaying the "Original Print/Type and Photographer" page, the "CD-ROM" button 58 for displaying the "CD-ROM" page, the "Others" button 59 for displaying the "Others" page, the "Basket" button 62 for displaying the "Basket Check" page, the "Info" button 46, and the "Return" button 64 for displaying the previous page are displayed.

In addition, the "Original Print" icon 66 for displaying the "Original Print/Type and Photographer" page, the "CD-ROM" icon 68 for displaying the "CD-ROM" page, and the "Others" icon 69 for displaying the "Others" page are displayed on the "Store Menu" page.

Figure 7:
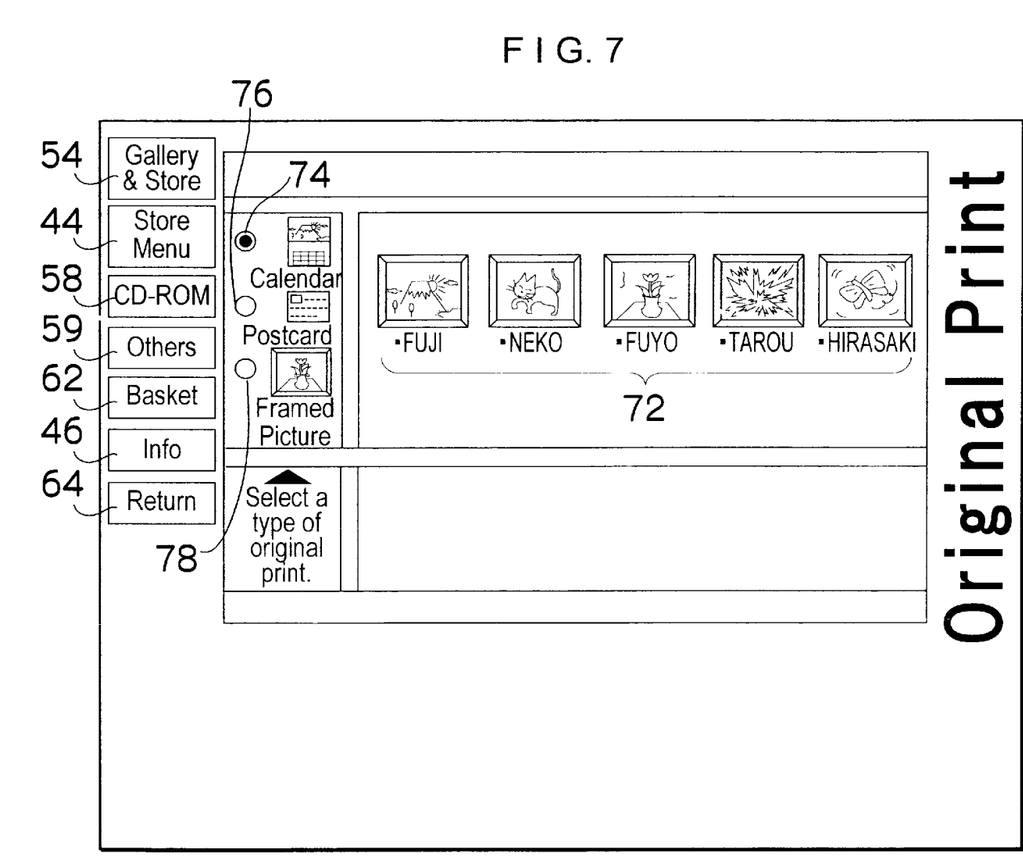
FIG. 7 is a diagram showing the "Original Print/Type and Photographer" page.

If the user clicks the "Original Print" button 56 or the "Original Print" icon 66, the "Original Print/Type and Photographer" page shown in FIG. 7 is displayed at step 108.

On the "Original Print/Type and Photographer" page in FIG. 7, the "Gallery & Store" button 54, the "Store Menu" button 44, the "CD-ROM" button 58, the "Others" button 59, the "Basket" button 62, the "Info" button 46 and the "Return" button 64 are displayed.

In addition, the "Calendar" button 74 for choosing to shop for a calendar, the "Postcard" button 76 for choosing to shop for a postcard, the "Framed Picture" button 78 for choosing to shop for a framed picture, and "Photographer" icons 72 for selecting the photographer are displayed on the "Original Print/Type and Photographer" page.

Figure 8:
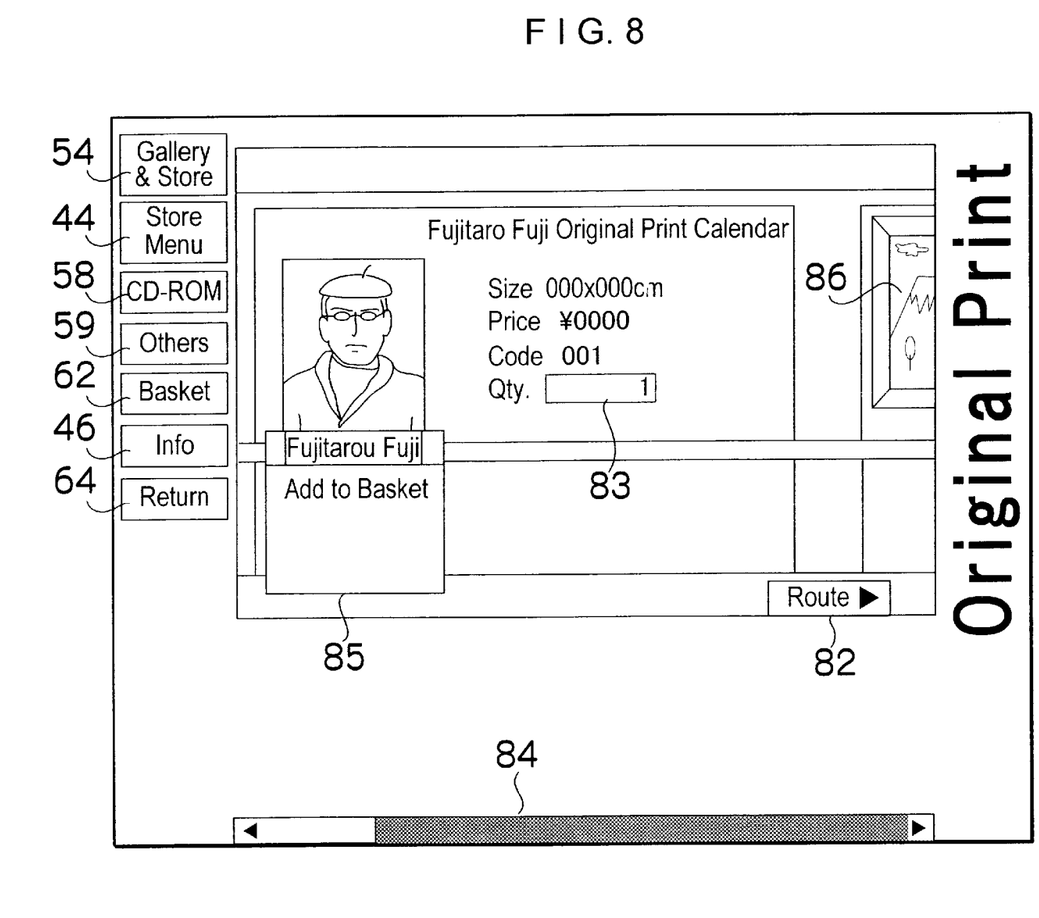
FIG. 8 is a diagram showing the "Original Print/Calendar" page.

If the user clicks the "Calendar" button 74 and one of the "Photographer" icons 72, the "Original Print/Calendar" page shown in FIG. 8 is displayed at step 110.

On the "Original Print/Calendar" page in FIG. 8, the "Gallery & Store" button 54, the "Store Menu" button 44, the "CD-ROM" button 58, the "Others" button 59, the "Basket" button 62, the "Info" button 46 and the "Return" button 64 are displayed.

In addition, a picture of the selected photographer and the size, the item code and the price of the calendar are displayed on the "Original Print/Calendar" page. The user looks at pictures 86 (only one is displayed in FIG. 8) by clicking the "Route" button 82 or operating the scroll bar 84, and selects desired pictures for the calendar by clicking some of the pictures 86.

The user also sets the format (font and language), the start month, the layout, and the term of the calendar. If the user sets February as the start month, the calendar 10 starts from February as shown in FIG. 1. One leaf of the calendar does not necessarily show dates of two months, but it may show dates of one month and it may show dates of three months or more. Also, the user does not necessarily set the start month, but the current month or the next month may be automatically set as the start month. One year may be set as the term of the calendar 10.

The method of automatically setting the start month of the calendar 10 will now be explained.

Let the current month be the n-th month of the current year, and let the number of months in each leaf of the calendar be m. The n-th month or the (n+m)th month is set as the start month.

Alternatively, January, the n-th month, the (n+1)th month or the (n+m)th month is set as the start month.

Then, the user enters the quantity in the quantity box 83 and clicks the "Add to Basket" button 85 to put the calendar in the basket. If the user clicks the "Basket" button 62, the "Basket Check" page shown in FIG. 9 is displayed at step 112.

Figure 9:
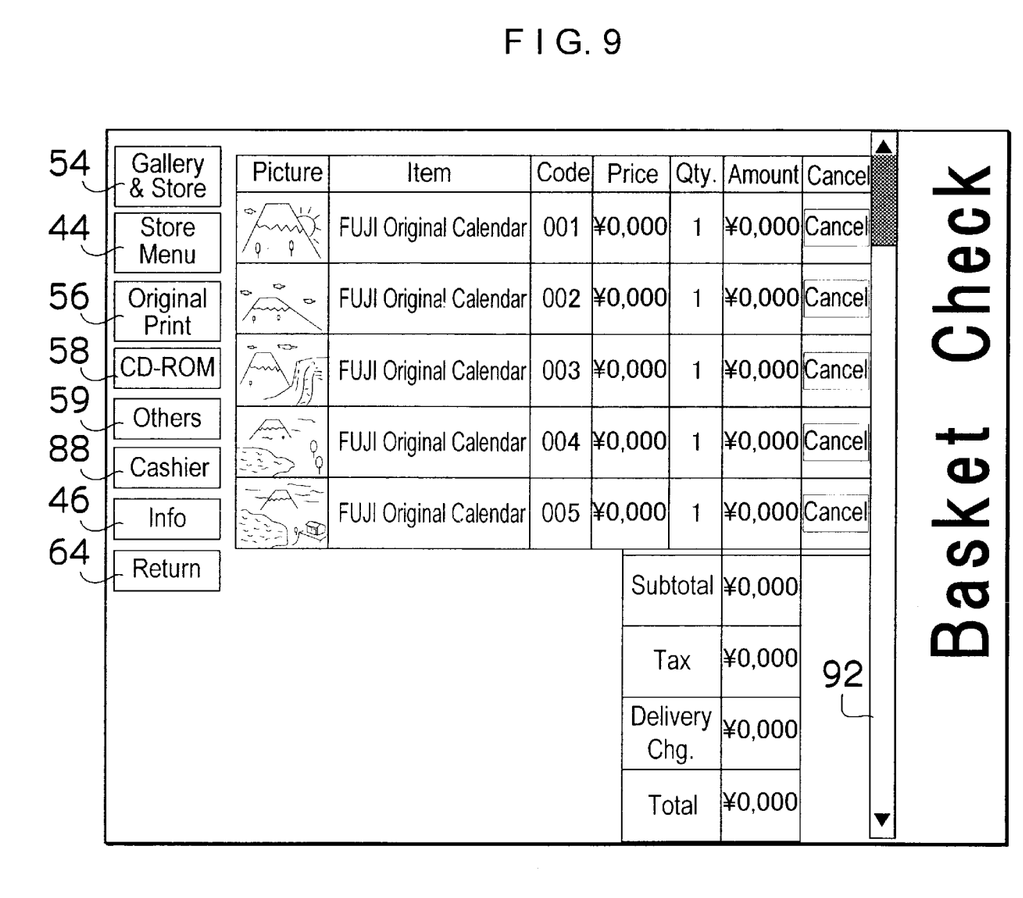
FIG. 9 is a diagram showing the "Basket Check" page.

On the "Basket Check" page in FIG. 9, the "Gallery & Store" button 54, the "Store Menu" button 44, the "Original Print" button 56, the "CD-ROM" button 58, the "Others" button 59, the "Cashier" button 88 for displaying the "Cashier/Delivery Address" page at step 114, the "Info" button 46 and the "Return" button 64 are displayed.

In addition, a thumbnail of one of selected pictures for each item, and the price, the quantity and the amount of each item are displayed so that the user can confirm the items in the basket, and the subtotal, the tax, the delivery charge and the total are displayed. Also, the "Cancel" buttons for removing the items from the basket and the scroll bar 92 are displayed.

Figure 10:
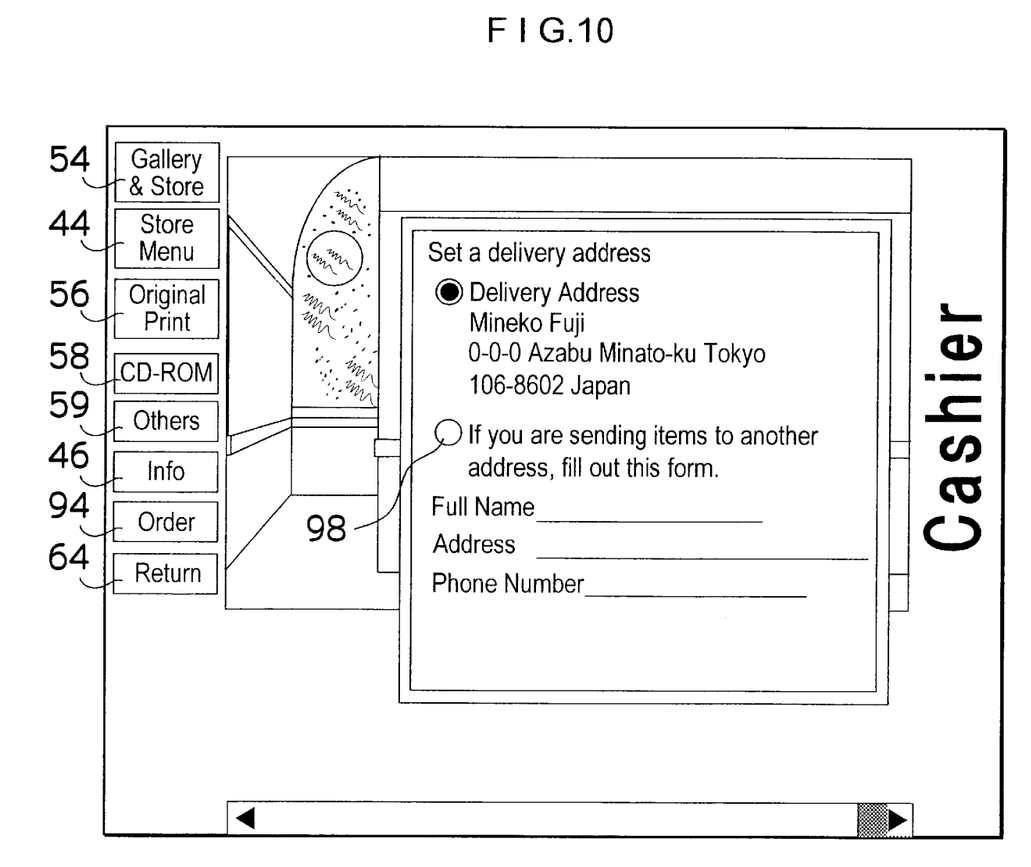
FIG. 10 is a diagram showing the "Cashier/Delivery Address" page.

If the user clicks the "Cashier" button 88, the "Cashier/Delivery Address" page shown in FIG. 10 is displayed at step 114.

On the "Cashier/Delivery Address" page in FIG. 10, the "Gallery & Store" button 54, the "Store Menu" button 44, the "Original Print" button 56, the "CD-ROM" button 58, the "Others" button 59, the "Info" button 46, the "Order" button 94 for displaying the "Cashier/Order" page at step 116, and the "Return" button 64 are displayed.

In addition, the address of the user registered with the provider 28 or the like is displayed as the delivery address. If the user wants the printing office 24 to deliver the order to another address, the user clicks the "Another Delivery Address" button 98 and enters the address.

Figure 11:
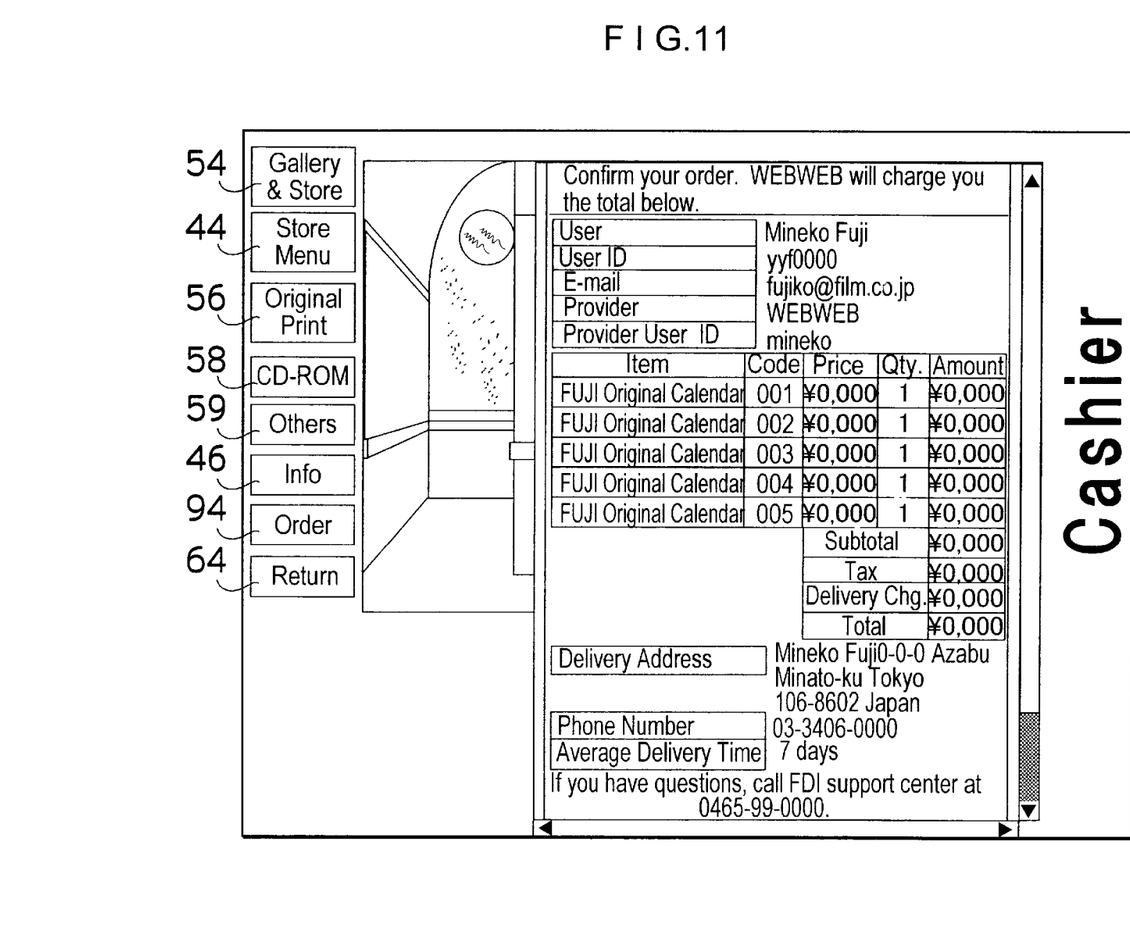
FIG. 11 is a diagram showing the "Cashier/Order" page.

If the user clicks the "Order" button 94, the "Cashier/Order" page shown in FIG. 11 is displayed at step 116.

On the "Cashier/Order" page in FIG. 11, the "Gallery & Store" button 54, the "Store Menu" button 44, the "Original Print" button 56, the "CD-ROM" button 58, the "Others" button 59, the "Info" button 46, the "Order" button 94, and the "Return" button 64 are displayed.

The order and the delivery address are displayed again so that the user can confirm them.

Figure 12:
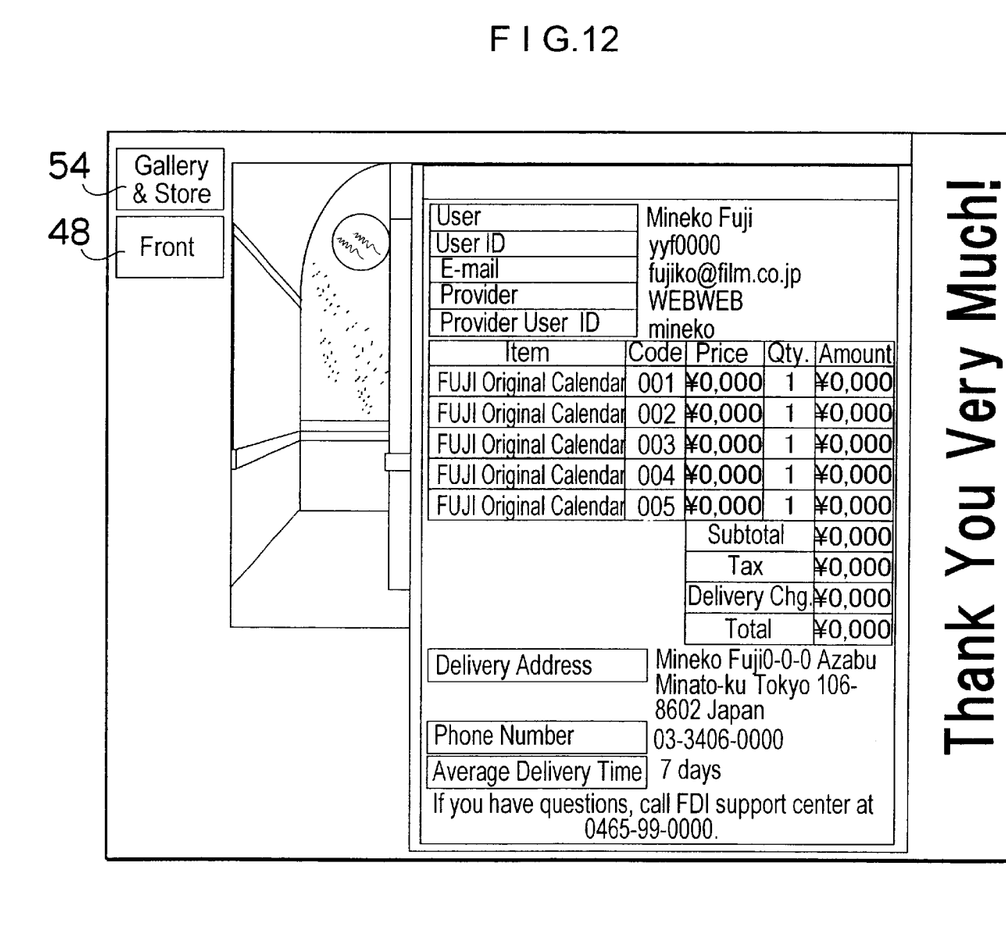
FIG. 12 is a diagram showing the "Memo" page.

If the user clicks the "Order" button 94 again, the basket is cleared and the "Memo" page shown in FIG. 12 is displayed at step 118.

On the "Memo" page in FIG. 12, the "Gallery & Store" button 54 and the "Front Page" button 48 are displayed. In addition, the order and the delivery address are displayed again.

The "Memo" page informing the user 20 that the order has been completed. If the user clicks the "Front Page" button 48, the "Front" page is displayed again.

As set forth hereinabove, according to the present invention, the calendar producing system comprises the server that stores the information of a plurality of pictures and the terminal that receives the information of the plurality of pictures from the server and shows the information to the user, and the user selects some pictures for the calendar from the plurality of pictures according to the information with the terminal to order the calendar. The calendar producing system also comprises the printing office that receives the information of the pictures selected by the user from the server and prints the calendar with the pictures selected by the user and a sequence of dates set by the user or a sequence of dates automatically set according to the date of the order. Therefore, the calendar can be produced quickly all through the year.

As set forth hereinabove, according to the present invention, the calendar producing system comprises the machine that stores the information of a plurality of pictures and shows the information of the plurality of pictures to the user, and the user selects some pictures for the calendar from the plurality of pictures according to the information with the machine to order the calendar. The calendar producing system also comprises the printing office that receives the information of the pictures selected by the user from the machine and prints the calendar with the pictures selected by the user and a sequence of dates set by the user or a sequence of dates automatically set according to the date of the order. Therefore, the calendar can be produced quickly all through the year.

As set forth hereinabove, according to the present invention, in the calendar producing method, the user selects some pictures for the calendar from a plurality of pictures with the terminal to order the calendar, and the information of the pictures selected by the user is transmitted to the printing office through the communication circuit, and the printing office prints the calendar with the pictures selected by the user and a sequence of dates set by the user or a sequence of dates automatically set according to the date of the order. Therefore, the calendar can be produced quickly all through the year.

As set forth hereinabove, according to the present invention, the calendar selling system comprises the server that stores the information of a plurality of pictures and the terminal that receives information of the plurality of pictures from the server and shows the information to the user, and the user selects some pictures for the calendar from the plurality of pictures according to the information with the terminal to order the calendar. The calendar selling system also comprises the printing office that receives the information of the pictures selected by the user from the server, prints the calendar with the pictures selected by the user and a sequence of dates set by the user or a sequence of dates automatically set according to the date of the order, delivers the calendar to the user and bills the user. Therefore, the desired calendar can be purchased all through the year and delivered to the user quickly.

As set forth hereinabove, according to the present invention, the calendar selling system comprises the machine that stores the information of a plurality of pictures and shows the information of the plurality of pictures to the user, and the user selects some pictures for the calendar from the plurality of pictures according to the information with the machine to order the calendar. The calendar selling system also comprises the printing office that receives the information of the pictures selected by the user from the machine, prints the calendar with the pictures selected by the user and a sequence of dates set by the user or a sequence of dates automatically set according to the date of the order, delivers the calendar to the user and bills the user. Therefore, the desired calendar can be purchased all through the year and delivered to the user quickly.

As set forth hereinabove, according to the present invention, in the calendar selling method, the user selects some pictures for the calendar from a plurality of pictures with the terminal to order the calendar, and the information of the pictures selected by the user is transmitted to the printing office through the communication circuit, and the printing office prints the calendar with the pictures selected by the user and a sequence of dates set by the user or a sequence of dates automatically set according to the date of the order, and the printing office delivers the calendar to the user and bills the user. Therefore, the desired calendar can be purchased all through the year and delivered to the user quickly.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A calendar producing system comprising:
   a server that stores information of a plurality of pictures;
   a terminal that receives information of the plurality of pictures from the server and shows the information to a user, the user selecting pictures for a calendar from the plurality of pictures according to the information with the terminal to order the calendar; and
   a printing office that receives information of the pictures selected by the user from the server and prints the calendar with the pictures selected by the user and a sequence of dates automatically set according to a date of the order.

2. The calendar producing system as defined in claim 1, wherein when the calendar is ordered in an n-th month of a current year and a number of months shown in each leaf of the calendar is m, one of the n-th month and an (n+m)th month is automatically set as a start month of the dates of the calendar.

3. A calendar producing system comprising:
   a machine that stores information of a plurality of pictures and shows the information of the plurality of pictures to a user, the user selecting pictures for a calendar from the plurality of pictures according to the information with the machine to order the calendar; and
   a printing office that receives information of the pictures selected by the user from the machine and prints the calendar with the pictures selected by the user and a sequence of dates automatically set according to a date of the order.

4. The calendar producing system as defined in claim 3, wherein when the calendar is ordered in an n-th month of a current year and a number of months shown in each leaf of the calendar is m, one of the n-th month and an (n+m)th month is automatically set as a start month of the dates of the calendar.

5. A calendar producing method comprising:
   selecting by a user pictures for a calendar from a plurality of pictures with a terminal to order the calendar;
   transmitting information of the pictures selected to a printing office through a communication circuit; and
   printing the calendar with the pictures selected and a sequence of dates automatically set according to a date of the order.

6. The calendar producing method as defined in claim 5, wherein when the calendar is ordered in an n-th month of a current year and a number of months shown in each leaf of the calendar is m, one of the n-th month and an (n+m)th month is automatically set as a start month of the dates of the calendar.

7. A calendar selling system comprising:
   a server that stores information of a plurality of pictures;
   a terminal that receives information of the plurality of pictures from the server and shows the information to a user, the user selecting pictures for a calendar from the plurality of pictures according to the information with the terminal to order the calendar; and
   a printing office that receives information of the pictures selected by the user from the server, prints the calendar with the pictures selected by the user and a sequence of dates automatically set according to a date of the order, delivers the calendar to the user and bills the user.

8. The calendar selling system as defined in claim 7, wherein when the calendar is ordered in an n-th month of a current year and a number of months shown in each leaf of the calendar is m, one of the n-th month and an (n+m)th month is automatically set as a start month of the dates of the calendar.

9. A calendar selling system comprising:
   a machine that stores information of a plurality of pictures and shows the information of the plurality of pictures to a user, the user selecting pictures for a calendar from the plurality of pictures according to the information with the machine to order the calendar; and
   a printing office that receives information of the pictures selected by the user from the machine, prints the calendar with the pictures selected by the user and a sequence of dates automatically set according to a date of the order, delivers the calendar to the user and bills the user.

10. The calendar selling system as defined in claim 9, wherein when the calendar is ordered in an n-th month of a current year and a number of months shown in each leaf of the calendar is m, one of the n-th month and an (n+m)th month is automatically set as a start month of the dates of the calendar.

11. A calendar selling method comprising:
    selecting by a user pictures for a calendar from a plurality of pictures with a terminal to order the calendar;
    transmitting information of the pictures selected to a printing office through a communication circuit;
    printing the calendar with the pictures selected and a sequence of dates automatically set according to a date of the order; and
    delivering the calendar to the user and billing the user.

12. The calendar selling method as defined in claim 11, wherein when the calendar is ordered in an n-th month of a current year and a number of months shown in each leaf of the calendar is m, one of the n-th month and an (n+m)th month is automatically set as a start month of the dates of the calendar.

13. A calendar producing system comprising:
    a server that stores information of a plurality of pictures;
    a terminal that receives information of the plurality of pictures from the server and shows the information to a user, the user selecting pictures for a calendar from the plurality of pictures according to the information with the terminal to order the calendar; and
    a printing office that receives information of the pictures selected by the user from the server and prints the calendar with the pictures selected by the user and a sequence of dates set by the user,
    wherein said terminal displays a screen for selecting a start date of the calendar.

14. The calendar producing system as defined in claim 13, wherein the terminal displays a plurality of start months of the calendar, and is used to select a start month from the plurality of start months.

15. A calendar producing system comprising:
    a machine that stores information of a plurality of pictures and shows the information of the plurality of pictures to a user, the user selecting pictures for a calendar from the plurality of pictures according to the information with the machine to order the calendar; and
    a printing office that receives information of the pictures selected by the user from the machine and prints the calendar with the pictures selected by the user and a sequence of dates set by the user, wherein said machine displays a screen for selecting a start date of the calendar.

16. The calendar producing system as defined in claim 15, wherein the machine displays a plurality of start months of the calendar, and is used to select a start month from the plurality of start months.

17. A calendar producing method comprising:

selecting by a user pictures for a calendar from a plurality of pictures with a terminal to order the calendar;

transmitting information of the pictures selected to a printing office through a communication circuit; and printing the calendar with the pictures selected and a sequence of dates set by the user, wherein said terminal displays a screen for selecting a start date of the calendar.

18. A calendar selling system comprising:

a server that stores information of a plurality of pictures;

a terminal that receives information of the plurality of pictures from the server and shows the information to a user, the user selecting pictures for a calendar from the plurality of pictures according to the information with the terminal to order the calendar; and a printing office that receives information of the pictures selected by the user from the server, prints the calendar with the pictures selected by the user and a sequence of dates set by the user, delivers the calendar to the user and bills the user, wherein said terminal displays a screen for selecting a start date of the calendar.

19. The calendar selling system as defined in 18, wherein the terminal displays a plurality of start months of the calendar, and is used to select a start month from the plurality of start months.

20. A calendar selling system comprising:

a machine that stores information of a plurality of pictures and shows the information of the plurality of pictures to a user, the user selecting pictures for a calendar from the plurality of pictures according to the information with the machine to order the calendar; and a printing office that receives information of the pictures selected by the user from the machine, prints the calendar with the pictures selected by the user and a sequence of dates set by the user, delivers the calendar to the user and bills the user, wherein said machine displays a screen for selecting a start date of the calendar.

21. The calendar selling system as defined in claim 20, wherein the machine displays a plurality of start months of the calendar, and is used to select a start month from the plurality of start months.

22. A calendar selling method comprising:

selecting by a user pictures for a calendar from a plurality of pictures with a terminal to order the calendar;

transmitting information of the pictures selected to a printing office through a communication circuit;

printing the calendar with the pictures selected and a sequence of dates set by the user; and delivering the calendar to the user and billing the user, wherein said terminal displays a screen for selecting a start date of the calendar.

* * * * *